United States Patent
Rowland et al.

(10) Patent No.: US 10,061,041 B2
(45) Date of Patent: Aug. 28, 2018

(54) NEUTRON DETECTION USING POISSON DISTRIBUTION COMPARISON INDEPENDENT OF COUNT RATE BASED ON CORRELATION SIGNALS

(71) Applicant: Lawrence Livermore National Security, LLC, Livermore, CA (US)

(72) Inventors: Mark S. Rowland, Alamo, CA (US); Neal J. Snyderman, Berkeley, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 775 days.

(21) Appl. No.: 14/298,406

(22) Filed: Jun. 6, 2014

(65) Prior Publication Data

US 2014/0348286 A1 Nov. 27, 2014

Related U.S. Application Data

(63) Continuation-in-part of application No. 12/712,040, filed on Feb. 24, 2010, now Pat. No. 8,891,720, which is a continuation-in-part of application No. 11/233,228, filed on Sep. 21, 2005, now Pat. No. 8,155,258.

(60) Provisional application No. 60/612,968, filed on Sep. 24, 2004.

(51) Int. Cl.
*G01V 5/00* (2006.01)
*G01T 3/00* (2006.01)

(52) U.S. Cl.
CPC .............. *G01T 3/00* (2013.01); *G01V 5/0091* (2013.01)

(58) Field of Classification Search
CPC .......... G01T 3/00; G01T 1/167; G01V 5/0091
See application file for complete search history.

(56) References Cited

PUBLICATIONS

Mihalczo et al., "Physical description of nuclear materials identification system (NMIS) signatures" Nuclear Instruments and Methods in Physics Research A, vol. 450, 2000, pp. 531-555.*
Ensslin et al., "Application Guide to Neutron Multiplicity Counting," LA-13422-M, UC-700, Nov. 1998, pp. 1-121.*
Hage and Cifarelli, "Correlation Analysis with Neutron Count Distributions in Randomly or Signal Triggered Time Intervals for Assay of Special Fissile Materials" Nuclear Science and Engineering: 89, 1985, pp. 159-176.*

* cited by examiner

*Primary Examiner* — Sharon M Davis
(74) *Attorney, Agent, or Firm* — Staniford Tomita

(57) ABSTRACT

Embodiments are directed to comparison-based methods of conditionally assessing the excess in correlation of an unknown neutron count measurement compared to the correlation present in a data defined as background, and to providing a technical definition of excess correlation intended to properly handle the measured excess correlation. The degree of correlation between an unknown source and background can be used to prevent masking of neutron count data for the source by background radiation.

5 Claims, 9 Drawing Sheets

| Multiplicity | 0 | 1 | 2 | 3 |
|---|---|---|---|---|
| Actual Background | 7209176 | 8463 | 43 | 1 |
| Expected Background | 7209166 | 8481 | 34 | 0 |
| Poisson Distribution | 7209136 | 8541 | 5 | 0 |

NEUTRON DETECTION USING POISSON DISTRIBUTION COMPARISON INDEPENDENT OF COUNT RATE BASED ON CORRELATION SIGNALS

CROSS-REFERENCE TO RELATED APPLICATIONS

This application is a Continuation-In-Part of U.S. patent application Ser. No. 12/712,040, filed on Feb. 24, 2010 entitled "Fission Meter and Neutron Detection Using Poisson Distribution Comparison," which is a Continuation-In-Part of U.S. patent application Ser. No. 11/233,228, filed on Sep. 21, 2005 entitled "Fission Meter," which in turn claims the benefit of U.S. Provisional Patent Application No. 60/612,968 filed by Mark S. Rowland and Neal J. Snyderman Sep. 24, 2004 and titled "Fission Meter."

STATEMENT REGARDING FEDERALLY SPONSORED RESEARCH

The United States Government has rights in this invention pursuant to Contract No. DE-AC52-07NA27344 between the United States Department of Energy and the University of California for the operation of Lawrence Livermore National Laboratory.

FIELD

The present invention relates to nuclear fission and more particularly to a method and system of detecting neutron emission from a material relative to a Poisson distribution and independently of count rate based on correlation signals.

BACKGROUND

The detection and interdiction of illicitly trafficked Special Nuclear Material (SNM) is very important in the ongoing anti-terrorist activities undertaken by homeland security agencies. U.S. Patent Application No. 2005/0105665 by Lee Grodzins and Peter Rothschild for a system of detection of neutrons and sources of radioactive material, published May 19, 2005, provides the following state of technology information: "There is a need to find sources of radiation and other nuclear material that are clandestinely transported across national boundaries. The sources of clandestine nuclear material may be in the form of "dirty bombs" (e.g., a conventional explosive combined with radioactive nuclides designed to spread radioactive contamination upon detonation), fissile material, and other neutron and radiation emitting sources that may present a hazard to the public. During recent years, the United States government has placed mobile vehicles at strategic areas with gamma ray detectors dedicated to the task of finding fissile material. Atomic explosives may be made from $^{235}$U, a rare, naturally occurring, isotope of uranium that lives almost $10^9$ years, or $^{239}$PU, a reactor-made isotope that lives more than $10^4$ years. $^{235}$U decays with the emission of gamma ray photons (also referred to as 'gammas'), principally at 185.6 keV and 205.3 keV. $^{239}$Pu emits a number of gamma rays when it decays, the principal ones being at 375 keV and 413.7 keV. These gamma rays are unique signatures for the respective isotopes. But fissile material invariably contains other radioactive isotopes besides those essential for nuclear explosives. For example, weapons grade uranium may contain as little as 20% $^{235}$U; the rest of the uranium consists of other isotopes. The other uranium and plutonium isotopes reveal their presence by gamma rays emitted by their daughters. For example, a daughter of $^{238}$U emits a high energy gamma ray at 1,001 keV; a daughter of $^{232}$U, an isotope present in fissile material made in the former USSR, emits a very penetrating gamma ray at 2,614 keV; and a daughter of $^{241}$Pu emits gamma rays of 662.4 keV and 722.5 keV."

U.S. Pat. No. 4,201,912 issued May 6, 1980 to Michael L. Evans et al and assigned to The United States of America as represented by the U.S. Department of Energy, provides the following state of technology information: "A device for detecting fissionable material such as uranium in low concentrations by interrogating with photoneutrons at energy levels below 500 keV, and typically about 26 keV. Induced fast neutrons having energies above 500 keV by the interrogated fissionable material are detected by a liquid scintillator or recoil proportional counter, which is sensitive to the induced fast neutrons. Since the induced fast neutrons are proportional to the concentration of fissionable material, detection of induced fast neutrons indicates concentration of the fissionable material."

U.S. Pat. No. 3,456,113 issued Jul. 15, 1969 to G. Robert Keepin and assigned to the United States of America as represented by the U.S. Atomic Energy Commission, provides the following state of technology information: "An apparatus and method of detecting, identifying and quantitatively analyzing the individual isotopes in unknown mixtures of fissionable materials. A neutron source irradiates the unknown mixture and the kinetic behavior of the delayed neutron activity from the system is analyzed with a neutron detector and time analyzer. From the known delayed neutron response of the individual fission species it is possible to determine the composition of the unknown mixture. Analysis of the kinetic response may be accomplished by a simple on-line computer enabling direct readout of isotopic assay."

A neutron is created by a physical process, either fission or an inducing nuclear reaction. The created neutron or neutrons then interact with the environment. If the environment contains more nuclear material (i.e., uranium), the first neutrons may create more neutrons by causing more fission or other nuclear reactions. The first and second and subsequent neutrons are a chain. A chain may start with an alpha particle creating a single neutron that subsequently creates hundreds of fissions. Another chain may start with a spontaneous fission creating three neutrons that go on to create hundreds of fissions. These chains evolve over time and some of the neutrons are absorbed or lost. Some members of the chain may be finally captured in a neutron detector device. The final captured neutrons may be counted as a simple sum or observed as a time dependent rate. What may start out as a chain of 1000 neutrons may result in a count of two neutrons during some period of time, in a detector.

Fission is generally defined as the emission of multiple neutrons after an unstable nucleus disintegrates. For example, Pu240 decays at a rate of about 400 fissions per second per gram of Pu240 atoms. When the fission occurs, multiple neutrons are emitted simultaneously, with the number ranging from zero to eight neutrons. This simultaneous neutron emission characteristic is unique to fission. A standard approach to locating neutron sources is to use a neutron detector to look for count rate increases above background patterns. Given the number of legitimate neutron sources used in industry, deploying standard neutron detectors will result in a large number of alarms that will need to be resolved by more intrusive inspection techniques.

Systems have been developed to identify when fission is occurring in an unknown or suspected dangerous source by providing an analysis of the range of simultaneous neutrons relative to standard (e.g., Poisson) distribution curves. Such systems employ methods of counting neutrons from the unknown source and detecting excess grouped neutrons to identify fission in the unknown source. Such systems may also include methods of plotting a Poisson count distribution on top of a measured count distribution, such that the mean count of the data is the same as that of the Poisson curve, and discerning differences attributed to fission in the unknown source. The objective of such methods is to assess a measurement to determine if there is correlation of emitted neutrons in excess of a background (or naturally occurring) level of neutrons.

In general, there is an obvious case where a neutron detector has a high count rate relative to the typical low background count rate because of the fact that there must be some kind of neutron source present otherwise the detected count rate would be near or at the expected count rate for the background count rate. Background count rates can vary, however, due to variations in time and environmental conditions. In this case, a simple comparison of detected versus background rates may result in erroneous data.

What is needed, therefore, is a method of conditionally assessing the excess in correlation of an unknown measurement compared to the correlation present in a data defined as background. What is further needed is a technical definition of excess correlation intended to properly handle the measured excess correlation, unlike the error of simply subtracting an erroneously defined background rate, or subtracting the second moments derived from two measurements, or subtracting mass equivalents derived by some theory about how correlation relates to effective mass of decaying nuclear material.

SUMMARY OF EMBODIMENTS

Embodiments of the present invention provide a neutron detection system that can be used to discriminate fissile material from non-fissile material. In general, a fissile material is one that is capable of sustaining a chain reaction of nuclear fission. The method may be implemented in a detection system that comprises a low cost digital data acquisition unit that collects data at high rate and in real-time processes large volumes of data directly into information that a first responder can use to discriminate materials.

In the following description, numerous specific details are introduced to provide a thorough understanding of, and enabling description for, embodiments of the neutron detection system. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Embodiments are directed computer-implemented method of analyzing radiation of a target source relative to background, by: measuring, for a first number of cycles, neutrons detected by a detector not placed in proximity to the target source to derive a background multiplicity count distribution of different multiplet sizes for a defined observation time; normalizing the background multiplicity count distribution to derive normalized background multiplets by dividing a number neutron detections for each multiplet size by the first number of cycles; deriving a set of background count distributions based on the normalized background multiplets to define a normalized correlation indicator; measuring, for a second number of cycles, neutrons detected by the detector placed in proximity to the target source to derive a source multiplicity count distribution of different multiplet sizes for the defined observation time; normalizing the source multiplicity count distribution to derive normalized source multiplets by dividing a number of neutron detections for each multiplet size by the second number of cycles; and determining if each normalized source multiplet exceeds each respective normalized background multiplet by a threshold defined by the normalized correlation indicator.

In this method, the normalized correlation indicator is derived by dividing a first normalized background multiplet value by a second normalized background multiplet value. The method further comprises dividing each normalized source multiplet by each respective normalized background multiplet to derive a series of ratios; and determining if the each ratio of the series of ratios exceeds unity. The method yet further comprises dividing out from each ratio a first normalized multiplet for each of the background and source count distributions to eliminate a factor of count rate in the respective count distributions. In an embodiment, the different multiplet sizes ranges from zero to six neutrons, and the defined observation time comprises 512 milliseconds. The method may further comprise determining the number of times that a group of n simultaneously emitted neutrons is observed from either the background or target source after the observation time is repeated a defined number of times to derive the respective background and source count distributions.

The method may be implemented in a nuclear assay process that comprises subtracting an expected number of pairs of neutrons emitted by a hypothetical non-fission Poisson neutron source during the observation time from the number of pairs of observed neutrons derived from the source count distribution; and characterizing the target source as fissile material if the number of pairs of observed neutrons exceeds the expected number of pairs of neutrons in at least a portion of a histogram derived for the Poisson neutron source as compared to a histogram derived for the neutron count measurement, and the each ratio of the series of ratios exceeds unity.

Embodiments are further directed to systems and products that embody one or more of the methods and processes described herein. Although the described embodiments are susceptible to modifications and alternative forms, specific embodiments are shown by way of example, and it should be noted that the invention is not limited to the particular forms disclosed. The described embodiments cover all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

INCORPORATION BY REFERENCE

Figure 1:
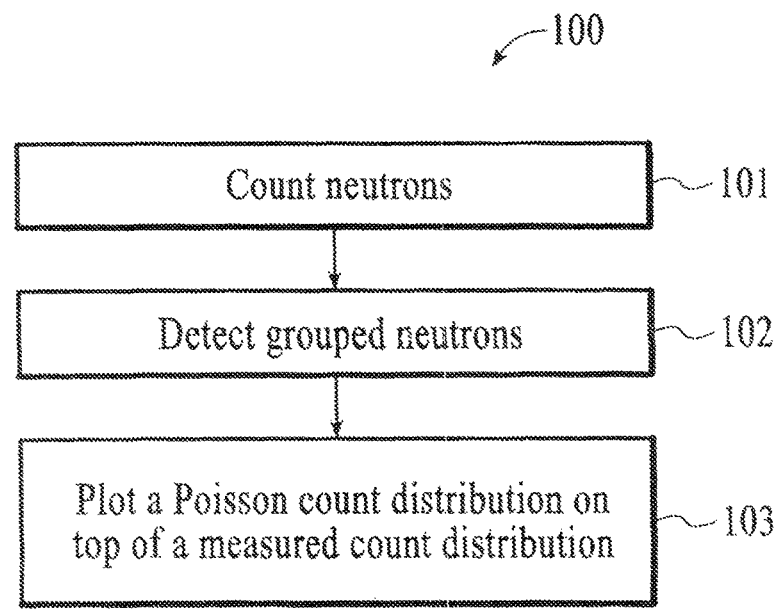
FIG. 1 illustrates a method of detecting fission from unknown and potentially dangerous sources of nuclear radiation, under an embodiment.

Each publication, patent, and/or patent application mentioned in this specification are herein incorporated by reference in its entirety to the same extent as if each individual publication and/or patent application was specifically and individually indicated to be incorporated by reference.

U.S. patent application Ser. No. 12/712,040, filed on Feb. 24, 2010, U.S. patent application Ser. No. 11/233,228, filed on Sep. 21, 2005, and U.S. Provisional Patent Application No. 60/612,968 filed Sep. 24, 2004 are hereby incorporated in their entirety by reference.

DETAILED DESCRIPTION OF THE INVENTION

Referring to the drawings, to the following detailed description, and to incorporated materials, detailed information about the invention is provided including the description of specific embodiments. The detailed description serves to explain the principles of such embodiments, which are susceptible to modifications and alternative forms. The described embodiments are not limited to the particular forms disclosed. The invention covers all modifications, equivalents, and alternatives falling within the spirit and scope of the invention as defined by the claims.

FIG. 1 illustrates a method of detecting fission from unknown and potentially dangerous sources of nuclear radiation, under an embodiment. A system implementing the method first counts neutrons emitted from the source; block 101. It then detects grouped neutrons, block 102, and plots a Poisson count distribution on top of a measured count distribution, block 103. An embodiment of the system 100 comprises plotting a Poisson count distribution over a measured count distribution, such that the mean count of the data is the same as that of the Poisson curve. The difference between the two superimposed distributions (curves) is then analyzed to discern neutron emission that may be attributed solely to fission in the unknown source.

A Poisson distribution or curve is a discrete probability distribution that expresses the probability of a number of events occurring in a fixed period of time if these events occur at a known average rate and are independent of one another. The Poisson distribution formula is as follows: $f(k;\lambda)=(e^{-\lambda}\lambda^{k}/k!)$ where k is the number of occurrences of an event and $\lambda$ is a positive real number of the expected number of occurrences during the given interval.

The system implementing the method of FIG. 1 can be used for mobile or stationary monitoring and characterization of the type of neutron sources inside packages. Some examples of uses of the system 100 include inspection of packed cargo containers and trucks. The present invention can be used for preventing illicit trafficking of fissioning nuclear material, can be used for the management of inventories of nuclear material, and can be used for management of waste streams of nuclear material. The system 100 is particularly useful where the desire is to have a simple, quick approach that minimally trained operators can use to improve the control of fissioning material.

In physics, fission is defined as the emission of multiple neutrons after an unstable nucleus disintegrates. For example, Pu240 decays at a rate of about 400 fissions per second per gram of Pu240 atoms. When the fission occurs, multiple neutrons are emitted simultaneously, with the number ranging from zero to eight neutrons. The present invention provides a system that can be used to identify when fission occurs by looking for the range of simultaneous neutrons. This simultaneous neutron emission characteristic is unique to fission. Embodiments are directed to a system that includes a multiplicity counter and a neutron detector that is set up to observe the presence of time grouped neutrons in order to detect the simultaneous emission of neutrons.

The method and system corresponding to that illustrated in FIG. 1 has many uses. For example, one use of the method comprises preventing illicit trafficking of fissioning nuclear material. Another use of the method comprises management of inventories of nuclear material. Another use of the method comprises management of waste streams of nuclear material. The method and system of FIG. 1 is particularly useful where the desire is to have a simple, quick approach that minimally trained operators can use to improve the control of fissioning material. The operators, for example may include border or traffic police, baggage handlers or freight companies, or for international treaty agreements that endeavor to identify, segregate, or manage the world's inventories of nuclear material.

Figure 2:
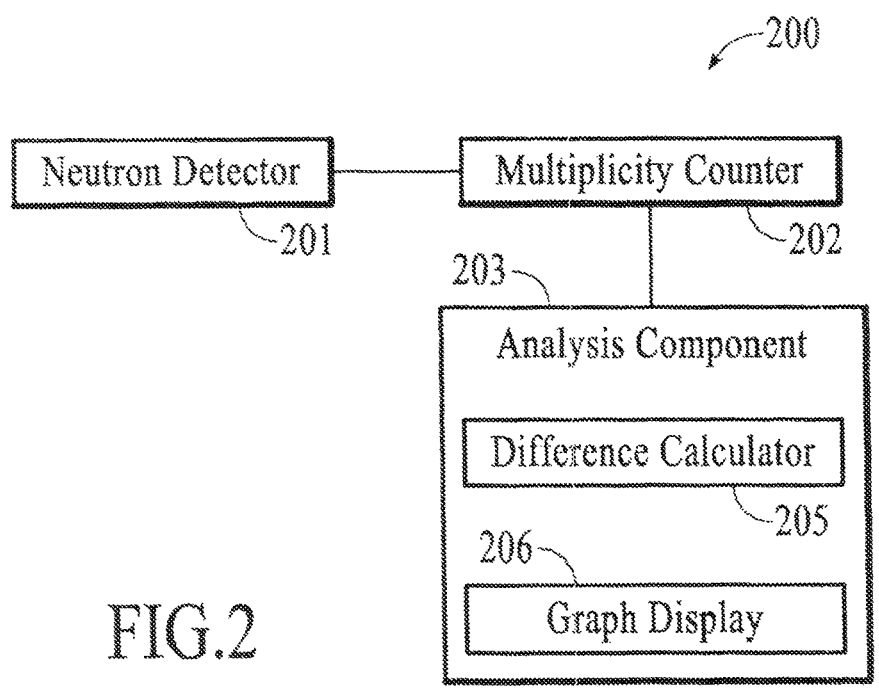
FIG. 2 illustrates a system for detecting fission from unknown and potentially dangerous sources of nuclear radiation, under an embodiment.

Referring now to FIG. 2, another embodiment of a system constructed in accordance with the present invention is illustrated. This embodiment of the system is designated generally by the reference numeral 200. The system 200 comprises a number of interconnected the structural components. A neutron detector 201 detects neutrons, a multiplicity counter 201 looks for a range of simultaneous neutrons from the unknown source. A calculator 203 calculates the difference between Poisson and unknown. The neutron detector 201 is operatively connected to the multiplicity counter 202. The calculator 203 is operatively connected to the multiplicity counter 202 and is set up to see time grouped neutrons to see simultaneous neutrons and identify fission from the unknown source.

The system 200 provides a simple way to discriminate the commonly used neutron sources from illicit (fissile) neutron sources. The system 200 comprises a fission meter apparatus for identifying fission from an unknown source. The fission meter apparatus 200 comprises a multiplicity counter 202 that looks for a range of excess neutrons from the unknown source, a neutron detector 201 operatively connected to the multiplicity counter, and a calculating system or analysis component 203 operatively connected to the multiplicity counter 202 that includes a difference calculator 205 to compute a difference between actual and expected neutron group sizes, which when positively identifies fission in the unknown source. In one embodiment the analysis component 203 also includes a graph display component for plotting a Poisson count distribution and graphically displaying it as superimposed on a measured count distribution, such that the mean count of the data is the same as that of the Poisson curve.

In one embodiment, the detector 201 is a neutron detector subsystem that consists of multiple moderated 7.5 atmosphere Helium-3 ($^3$He) neutron detectors. The detector subsystem includes high voltage supplies for the Helium tubes and preamplifier or discriminator units required to achieve the pick-off of the neutron events. Depending upon configuration, the detector may consist of two or more large avalanche photodiodes viewing a gas volume filled with the pressurized Helium. Neutrons are detected through scintillation of the Helium. A wavelength shifting process, such as that known to those of ordinary skill in the art, is used to measure the degree of scintillation in order to provide a measure of neutron count in the photodiodes. The detector 201 gathers the neutron data and analyzes the data for coincidences, which are doublets, triplets, quads, or any multiplet up to a high order. Neutron multiplicities in various time sub-gates during each data acquisition cycles are recorded. An acquisition cycle may be defined as 512 time bins. In one embodiment, the multiplicity counter 202 comprises an electronic subsystem that processes the count data from the detection system. The relative time intervals between neutrons arriving at the detector are measured to build a statistical distribution of the multiplicity of the neutron detection. In one embodiment, the multiplicity counter takes each detected neutron and looks in up to 512 time interval gates to record the time interval between each neutron and others in the data stream from the detector.

The time bins define counting gates that are triggered by a trigger conditions. The trigger condition may be the detection of a first neutron. The detection of additional neutrons after the trigger neutron and within the time bin constitutes a pair, or more, of observed neutrons.

As further shown in FIG. 2, the analysis component 203 includes a difference calculator that analyzes the output from the multiplicity counter to determine if it is consistent with a background noise, an innocent source, or a potentially dangerous radioactive source. The analysis component 203 includes a difference calculator 205, which calculates the difference between the unknown source and a standard Poisson distribution, and a graph display that displays the neutron emission distribution of the unknown source and the Poisson distribution in a superimposed graphical representation. In one embodiment, the analysis component 203 performs an analysis of the neutron multiplicity data through a Feynman Variance Technique, or equivalent method.

In one embodiment of the system 200, the analysis component 203 includes a plotting system for plotting a Poisson count distribution on top of a measured count distribution, such that the mean count of the data is the same as that of the Poisson curve. In one embodiment of the system 200, the plotting system 203 is a computer. The system 200 provides a neutron detector that can be used to discriminate fissile material from non-fissile material. It comprises a low-cost digital data acquisition unit that collects data at high rate, and in real-time processes large volumes of data directly into information that a first responder can use to discriminate various types of materials. Neutron Count Plots One significant characteristic of fission is that neutrons emit in groups. Random sources of neutrons are emitted with no regard for grouping, however, since the appearance of these neutrons at the detector are randomly spread in time, some may accidentally appear in close temporal proximity. An example is a neutron detector that counts neutrons for short periods of time, for example ½ millisecond time periods (gate periods). This example time corresponds to a typical neutron diffusion time in a typical detector, the choice of which depends on specifics related to detector design. If the ½ msec. period is counted once, the count may be one, two, or three counts, or some other integer number, including zero. It is desirable to select an appropriate observation time, such as two to three times the typical neutron diffusion time, and then repeat the sampling of counts period many times to produce a histogram of counts described as the number of occurrences of each multiplet group. This yields a distribution of the number of times (e.g., 0, 1, 2, 3) that neutrons were observed over a number of detection periods (e.g., 10,000 repeated periods).

Figure 3A:
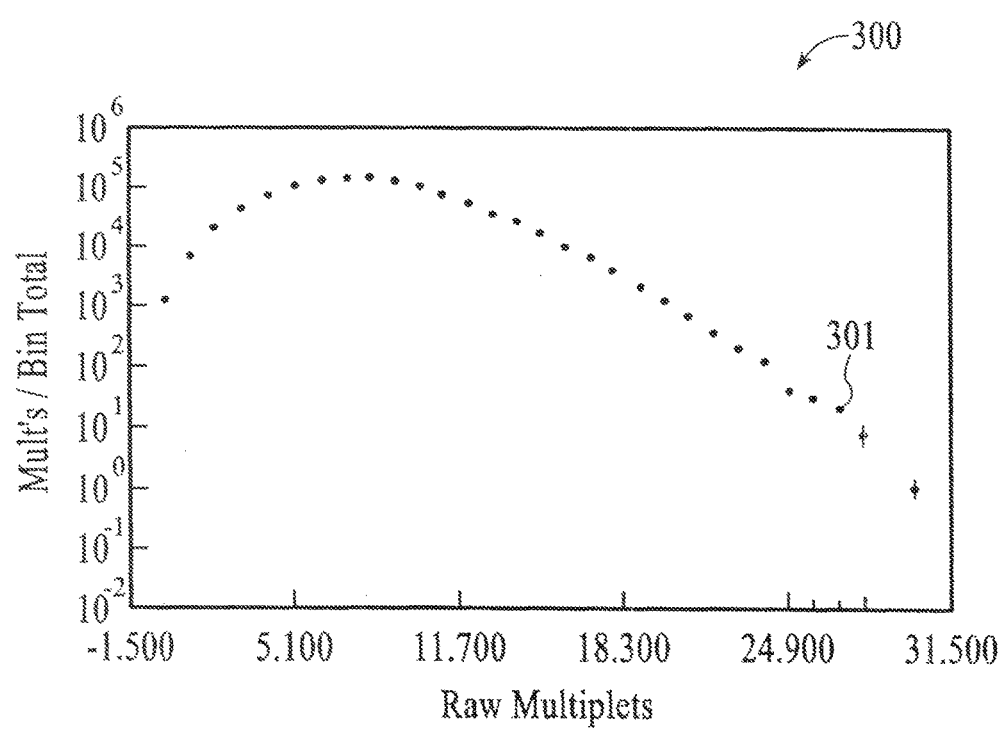
FIG. 3A illustrates an example plot of the count distribution of the frequency of neutrons emitted from an unknown source counted in a defined duration count gate.

FIG. 3A illustrates an example plot of the count distribution of the frequency of neutrons from an unknown source counted in a 512 microsecond count gate. For the example plot 301 of FIG. 3A, it can be seen that eight neutrons were observed $10^5$ times and 25 neutrons were observed about 100 times. The observed plot 301 provides an indication of the detection of coincidental neutrons (e.g., two or more neutrons emitted within a defined time period after detection of the first neutron) during a particular time gate.

Fission is unique in that it creates real correlations, while non-fission neutron sources create accidental correlations. Embodiments provide a method and system that utilizes new developments in how fission neutron chains are modeled to simplify and remove problems related to the assay of unknown packages of fissioning material.

Counting neutrons by looking for time-correlated groupings is called multiplicity counting. The groupings arise from the fission process where a portion of a fission chain is detected. The analysis of this type of data assists in deriving mass, multiplication, detector efficiency, and alpha ratio (mMeA). Other factors in the analysis include neutron lifetime ($L=1/\lambda$), measurement gate width (T), the maximum size of neutron multiplets observed (n), the background correlation and count rate (B), and the generalized Poisson exponent ($\Lambda$).

Figure 3B:
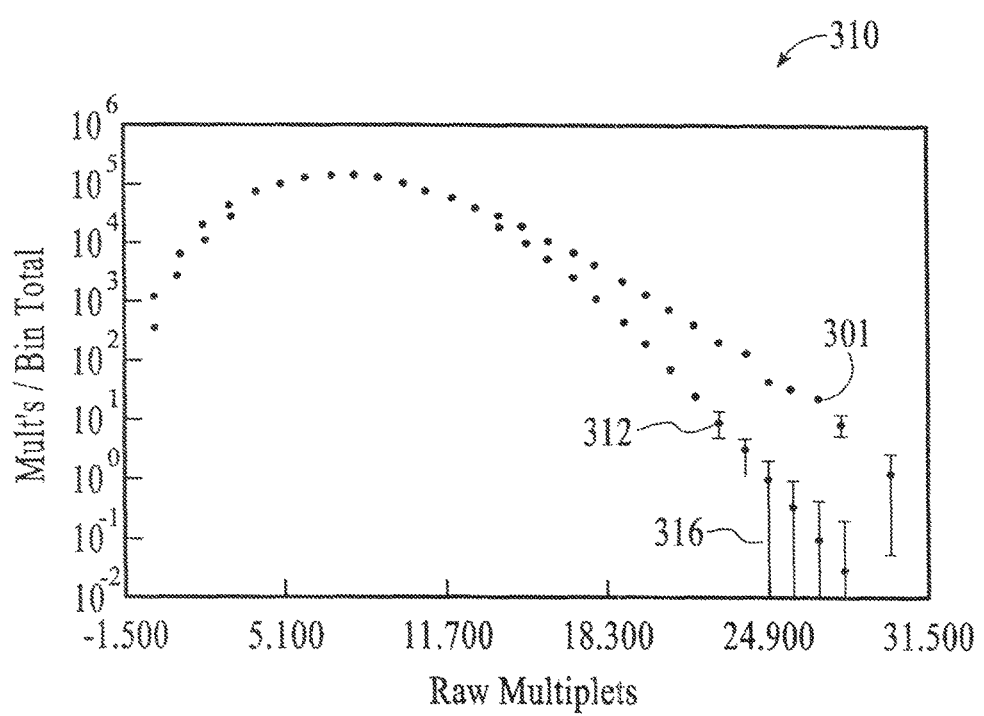
FIG. 3B shows a plot of a Poisson count distribution on top of the measured count distribution.

Referring now to FIG. 3B, a plot further illustrates the embodiments 100 and 200. The plot is designated generally by the reference numeral 310. The top curve 301 is a count distribution of the frequency of neutrons from an unknown source counted in a 512 microsecond count gate, such as that illustrated in FIG. 3A. For example, eight neutrons were observed $10^5$ times and 25 neutrons were observed about 100 times. The bottom curve 312 is a Poisson count distribution with the same mean count i.e., about seven. As can be seen in FIG. 3B, there is an increase in frequency of data above the Poisson points. That is, the actual distribution curve 301 exhibits a greater number of observed neutrons above the mean count than does the Poisson curve 312. This represents an excess number of emitted neutrons from the unknown source over the statistically expected number represented by the Poisson curve 312. If an operator observes such an excess, either visually or via a numerical subtraction, then fission is identified.

The actual amount of excess that triggers the detection of fission is defined by the constraints of the system and normal operating practice. The error bars 316 represent a range of error assigned to each count. If the actual number of neutrons exceeds the Poisson number but is within the error range, then fission may not be cause of such excess. However, if the actual number of neutrons exceeds the error range of the Poisson count by a pre-defined amount, then such an excess may be attributed to fission.

Figure 3C:
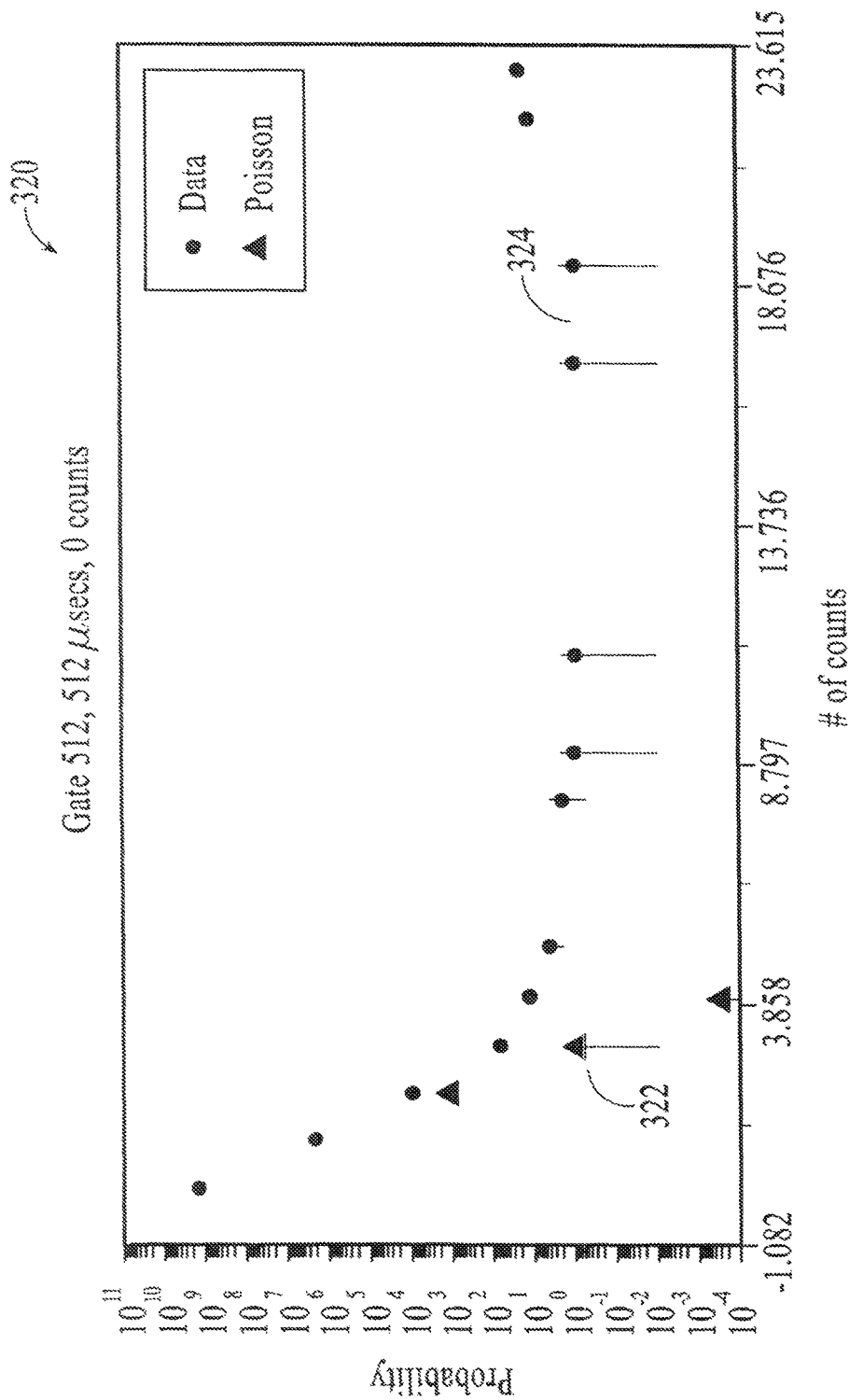
FIG. 3C shows a plot of a Poisson count distribution compared to background radiation.

In general, the presence of background radiation (e.g., cosmic rays) may be a factor in any detection process. However, methods of the fission meter plot described herein are still useful and generally not overwhelmed by background effects. In certain cases, a very weak fission source may be overwhelmed by combinations of background noise, however, a fission source that is practically detectable will have a count distribution curve that is similar to the Poisson distribution, as shown in FIG. 3B. Embodiments include a method for distinguishing background radiation to further refine the detection of fissioning material. Background radiation may be correlated to some degree, but has a very distinct count distribution curve. It has a flattened out portion after a certain number of counts, and does not monotonically decrease, as does a Poisson distribution. FIG. 3C shows a plot of a Poisson count distribution compared to background radiation. As shown in FIG. 3C, a count distribution for observed background data 324 is plotted relative to a Poisson distribution 322. A pure background source will show a curve that flattens or has a kink shape around counts 3 or 4, as shown in FIG. 3C. Therefore, a detectable radiation source will have a count distribution that resembles the Poisson shape, but with no kink, and, depending on its strength, it will overwhelm the background effects in the 3 and 4 count region. The practical range of filtering out background depends on various parameters associated in specifying a neutron detector, such as efficiency, distance from source, and so on. In a typical application, background count rates may be on the order of 3.5 counts/second (cps). A Cf (Californium) fission source with Multiplication=1 typically makes one million neutrons per second; at a distance of one meter, the detector efficiency is around 1% so the count rate would be thousands of cps. Such an example overwhelms the background effects. For a significant amount of fissioning material (e.g., tens of kilograms of uranium), for which the Multiplication=10, at one meter the count rate is 3 cps so the total count rate would be 6.5 cps. There is a clear deviation of 3, 4, 5, counts because of the multiplication, and the higher multiplets overwhelm background even though the count rate is near background. Through the graph display process 206, the generated count distribution plots will show that there is no "flat" tail on the observed count plots, unlike the background data shown in FIG. 3C. Thus, this method provides a means of distinguishing true fissioning sources from mere background and provides a basis for comparing a non-background source with a Poisson distribution. For cases in which the detector is within range of a signal from a fissioning source, it will report a distinction from both Poisson and background correlation.

The method and systems 100 and 200 comprise a first step of counting neutrons from the unknown source and a second step of detecting excess grouped neutrons to identify fission in the unknown source. In another embodiment the method and systems 100 and 200 comprise the steps of counting neutrons from the unknown source and detecting excess grouped neutrons to identify fission in the unknown source wherein said step of detecting excess grouped neutrons to identify fission in the unknown source includes plotting a Poisson count distribution on top of a measured count distribution, such that the mean count of the data is the same as that of the Poisson curve, and discerning differences attributed to fission in the unknown source. In another embodiment the method and systems 100 and 200 comprise the steps of counting neutrons from the unknown source and detecting excess grouped neutrons to identify fission in the unknown source includes plotting a Poisson count distribution on top of a measured count distribution, such that the mean count of the data is the same as that of the Poisson curve, and discerning differences attributed to fission in the unknown source and wherein said step of discerning differences attributed to fission in the unknown source comprises discerning visible differences in the Poisson count distribution superimposed over a measured count distribution plot that are attributed to fission in the unknown source.

The process illustrated in FIG. 3B of plotting the multiplet structure of the Poisson distribution and comparing it in a multiplet-by-multiplet fashion with the observed distribution is unbiased by any expectation that the triggering event (e.g., a trigger neutron) is the correct neutron with regard to whether it is a real or accidental. This automatically alerts the user to the correct and exact expected rate of accidental multiplets greater than one, and prevents the problem caused by systems that assume that all counts within the A gate are accidentals, which leads to the possible rejection of valid correlation information.

In general, neutrons are used in many industrial applications. Neutron signatures also indicate the presence of fissioning nuclear material. It is desirable to be able to separate benign industrial neutron sources from fission sources. Traditionally, detection of nuclear material has been accomplished by neutron counting. If neutron sources were rare, the misinterpretation of any neutron source as a fission source would be of little consequence. However, with the large scale introduction of nuclear monitoring equipment in daily commerce comes the need to not confuse the traffic of industrial sources with illicit traffic.

The method and systems 100 and 200 provide the basis for a visual or automated comparison of raw count distribution data, to a Poisson distribution with the same mean count, to show graphically the intuitive sense that the characteristic of fission is present. Optimally, the excess correlation, above a Poisson rate of correlation, may be alternatively or additionally provided by observing that numerical characteristics of the data and the corresponding Poisson distribution may be computed to form a numerical difference, redundantly indicative of fission.

The characteristic of fission is that neutrons emit in groups. That is, potentially dangerous unknown sources emit multiple coincident neutrons. This simultaneous emission is used in a detector to distinguish from random sources of neutrons that are emitted with no regard for grouping; however, since the appearance of these neutrons at the detector are randomly spread in time, some may accidentally appear in close temporal proximity. For example, consider a neutron detector that counts neutrons for short periods of time, say ½ millisecond. This example time period corresponds to a typical neutron diffusion time in a typical detector, the choice of which depends on the detector design and is not the subject here. If the ½ millisecond period is counted once, the count may be three counts, or some other integer number, including zero. One is expected to select an appropriate observation time, two to three times the typical neutron diffusion time, and then repeat the sampling of counts period many times to produce a histogram of counts described as the number of occurrences of each multiplet group. (i.e., number of times 0, 1, 2, 3 . . . were observed, in sum, over say 10,000 repeated detection periods.)

Fission is unique in that it creates real correlations, while non-fission neutron sources create accidental correlations. Unrecognized is the relative histogram comparison of the measured or unknown neutron source, with a mathematically generated count histogram that represents the hypothetical case of no fission. Visually, in isolation, one histogram looks like another.

Embodiments of the detector system include a histogram display system that allows direct graphical comparison of the measured source to the mathematically generated or Poisson distribution. The shape of the measured source histogram is derived from the characteristics of the measured unknown source. Graphically, this is illustrated in FIG. 3B. For the example of FIG. 3B, the tail portion of the histogram 301 is above the random or Poisson histogram 312. This excess correlation is due to fission, illustrating that a simple plot of data collected in one measurement, can be analyzed with a relatively simple procedure involving straightforward observation and comparison. Alternatively, it is possible to compute various quantities in order to derive mathematical count differences between the histograms in order to obtain numeric measures of excessive neutron emission. Threshold values can be defined such that automated processes can indicate the presence of a potentially dangerous source if the difference between the measured count exceeds the Poisson count in excess of the threshold.

One example of an alternative embodiment to the histogram overplot concept is to numerically compute quantities based on the single measurement of an unknown. Conceptually, the objective is to realize that the differences apparent in a comparison of histograms may be described as the number of pairs of counts observed in the unknown minus the number of count pairs expected if there were no fission (but the neutrons came from a non-fissioning neutron source).

# of pairs observed−expected random # of pairs

If the difference is zero, then the observed neutron source is not undergoing neutron fission. The number of pairs is only one example of a statistical quantity derivable from the measured histogram. Others might be the third or fourth moment of the histogram.

An alternative embodiment to the graphical histogram approach involves an analysis of the number of pairs of neutrons. As stated above, pairs of neutrons in excess of those expected is the test. Numerically this may be computed from the measured histogram:

$$\sum_{n=0}^{\infty} \frac{\frac{n(n-1)}{2} Cn}{2\sum_{n=0}^{\infty} Cn} - \left(\frac{\sum_{n=0}^{\infty} nCn}{\sum_{n=0}^{\infty} Cn}\right)^2 \cdot 1/2$$

This difference represents the absolute number of pairs in excess of that expected from a non-fissioning neutron source. In the above equation, n is the x-axis of the histogram and is the size of the group of neutrons observed, and Cn is the number of times that a group of n neutrons was observed after repeating the ½ msec. measurement a large number of times. Note that the mean count of the measured histogram defines the histogram of the expected or hypothetical non-fission histogram. The mean count of the measurement is:

$$c\text{-bar} = \bar{c} = \frac{\sum_{n=0}^{\infty} nCn}{\sum_{n=0}^{\infty} Cn}$$

The histogram expected from a non-fission source will have the same C-bar, however the shape of the histogram will be described by:

$$Cn\text{-poisson} = \frac{\bar{c}^n}{n!} e^{-\bar{c}}$$

In the above equation, n is the count group size. Whether the system simply plots Cn-Poisson on top of the measurement, as in the first embodiment, or computes difference quantities, as in the second embodiment, they represent the same insight that a uniquely observable fission neutron signature can be created from a single measurement, and can be useable by minimally trained operators to separate high value objects from common industrial sources.

Figure 4:
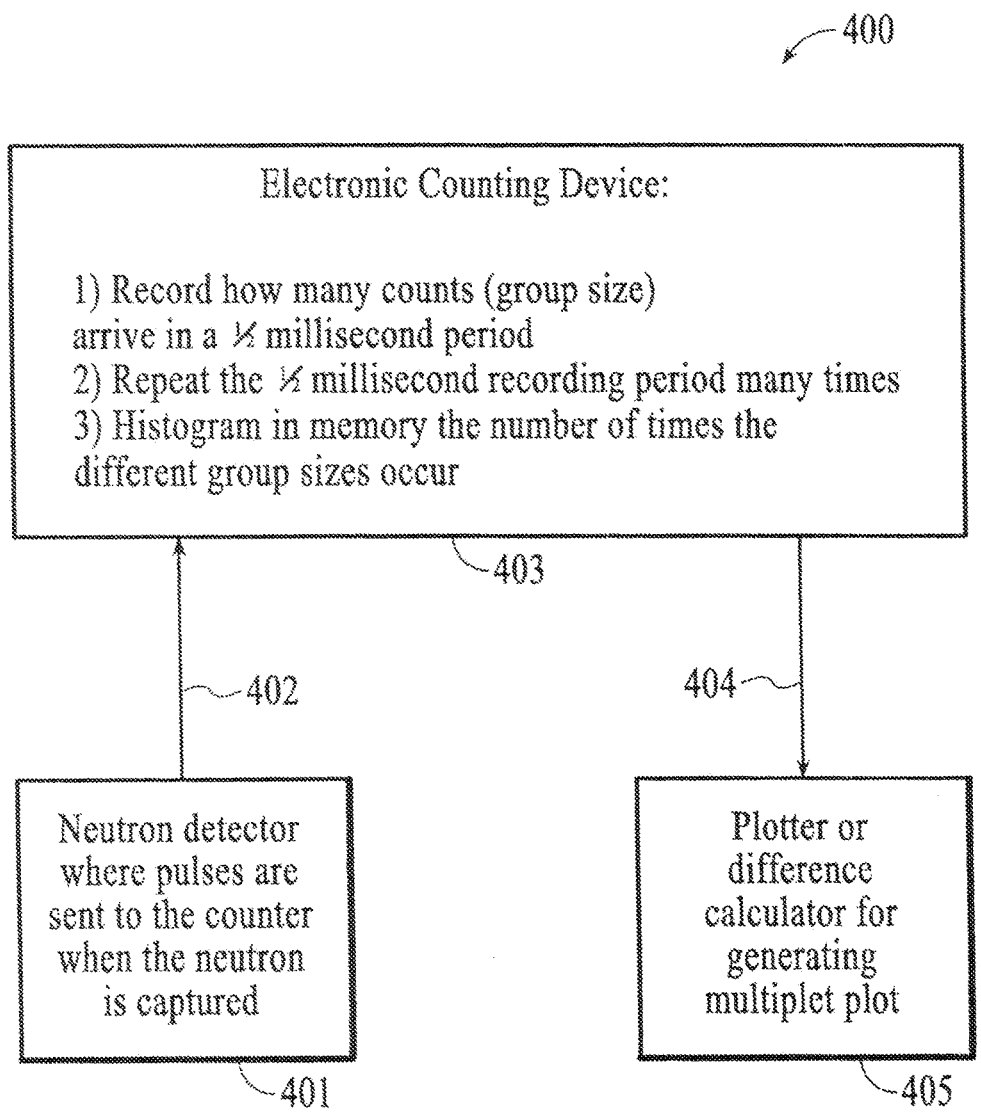
FIG. 4 illustrates another embodiment of a system constructed in accordance with the present invention.

Referring now to FIG. 4, another embodiment of a system constructed in accordance with the present invention is illustrated. This embodiment of the system is designated generally by the reference numeral 400. The neutron detector 401 detects neutrons. The neutron detector 401 is operatively connected to a counter 403. The arrow 402 illustrates pulses sent from the detector 401 to the counter 403. Pulses are sent to the counter 403 when neutrons are captured.

The counter 402 and is set up to see time grouped neutrons to see simultaneous neutrons and identify fission from the unknown source. The counter 402 (1) can record how many counts (group size) arrive in a ½ millisecond period, (2) repeat the 1.2 millisecond recording period many times, and (3) plot a histogram of the number of times the different group sizes occur.

The counter 403 is operatively connected to a plotter or difference calculator 405. The arrow 402 illustrates information from the counter 403 being sent the plotter or difference calculator 405. The system 400 provides a simple way to discriminate the commonly used neutron sources from illicit (fissile) neutron sources. In one embodiment a system plots a Poisson count distribution on top of a measured count distribution, such that the mean count of the data is the same as that of the Poisson curve. Such a comparison plot is shown in FIG. 3B.

In one embodiment, the neutron detector is used in a portable neutron source identification system that helps detect the presence of illicit radioactive material for use in homeland security applications. Such material can be used in deadly terrorist weapons such as Improvised Nuclear Devices (IND) or state built nuclear weapons. In general, these weapons require the presence of a so-called Special Nuclear Material (SNM), that is, Uranium or Plutonium, to create a nuclear explosion. Traditional methods of detecting and identifying the presence of SNM involve the use of gamma-ray detection. These methods, however, can be defeated through the use of heavy metal shielding. The neutron detector according to embodiments augments the technique of gamma-ray detection by identifying fission neutron sources by examining the inherent characteristics of the neutron decay process. The neutron detector under embodiments includes processing and filtering components that not only count neutrons, but check the source and environmental conditions for the existence of neutron sources beyond simple noise or environmental effects. Such a detector allows for the rapid and relatively certain detection of neutron sources from potentially dangerous sources, such as improvised nuclear devices or similar weapons.

A neutron source can be any of a variety devices that emit neutrons, irrespective of the mechanism used to produce the neutrons. Depending upon variables including the energy of the neutrons emitted by the source, the rate of neutrons emitted by the source, the size of the source, neutron source devices can be found in a diverse array of applications in areas of physics, engineering, medicine, nuclear weapons, petroleum exploration, biology, chemistry, nuclear power and other industries. Man-made sources include reactors that produce neutrons that can be used for experiments, and spallation sources that are high flux sources, in which protons that have been accelerated to high energies hit a target material, prompting the emission of neutrons.

Figures 5, 6:
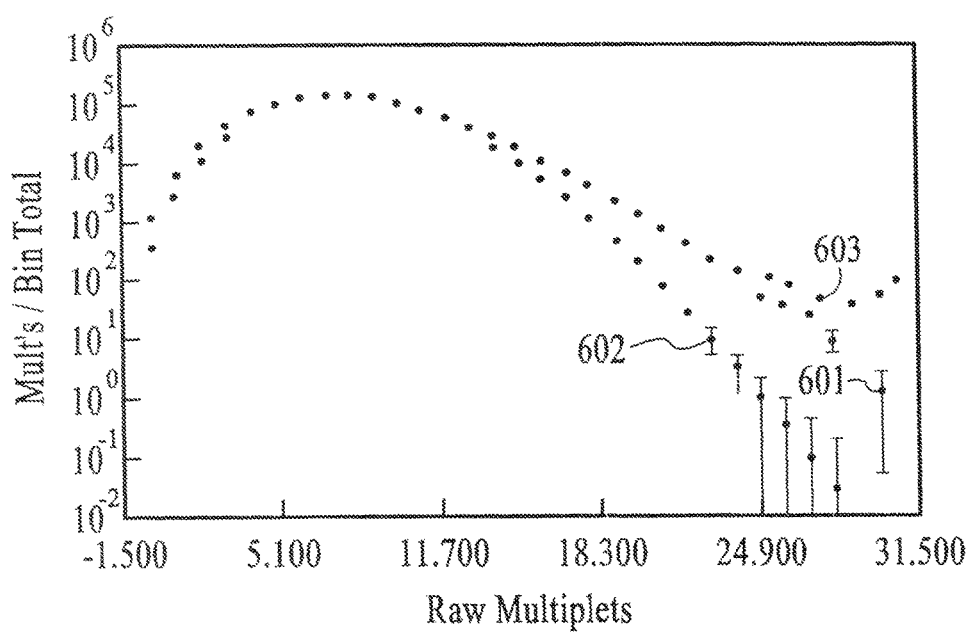
FIG. 5 is a table that illustrates a background count distribution.
FIG. 6 illustrates a neutron distribution curve illustrating a cosmic source.

In one embodiment, the neutron detection system includes a method for allowing the filtering of background neutron noise due to other sources, such as cosmic or man-made sources. Typical background consists of single neutrons and neutron groups from multiple neutron events caused by cosmic rays. The Poisson distribution of the events will cause some random coincidence events. These random coincidences can be calculated using the singles count rate and device characteristics. FIG. 5 is a table that illustrates a background count distribution for an example time period. For table 500 of FIG. 5, data was collected for a period of one hour resulting in a count of 8552 for a count rate of 2.31 counts per second (cps).

FIG. 6 illustrates a neutron distribution curve illustrating a cosmic source. In one embodiment, the simple observation of a neutron distribution curve with a shape like that shown in FIG. 3A would indicate the presence of neutrons due to cosmic interference. Correlation is indicated by the presence of events with higher order multiplicity in the distribution. As shown in FIG. 6 the actual background 603 is slightly more correlated than the neutron distribution from the unknown source 601, and both are more correlated than the pure Poisson distribution 602. Such an effect is also shown in FIG. 3C. As shown in FIG. 6, the actual background curve 603 has a characteristic and relatively pronounced curve up at the very end of the plot. The shape of curve 603 can be used by an analyst or a program to determine whether or not the presence of neutron emission is due to cosmic effects as opposed to a potentially dangerous source.

The distribution curves 601, 602, and 603 shown in FIG. 6 provide a graphical basis on which an analyst can view and identify man-made or environmental sources of neutrons. The difference in counts above the mean, that is, in the upper portion of each curve, along with the shape of the curve can be used to characterize the criticality of the hazard posed by an unknown source relative to the background and Poisson distributions. In one embodiment, analysis of the graphical neutron distribution data as generated by the neutron detection system can be viewed and analyzed by a human operator.

Alternatively, the graphical distribution data can be further processed in a program or electronic module to provide an interpretation of the data. This module can be configured to analyze one or more parameters associated with the distribution plot such as shape, rate of rise of a portion of the curve, point-by-point differences with the Poisson and/or environmental neutron plots, and so on. Such interpretation information can be used by a user or a further response system to trigger an appropriate response to the unknown source, such as sounding an alarm, ordering an evacuation, initiating an automatic detonation sequence, or any other appropriate action.

Figure 7:
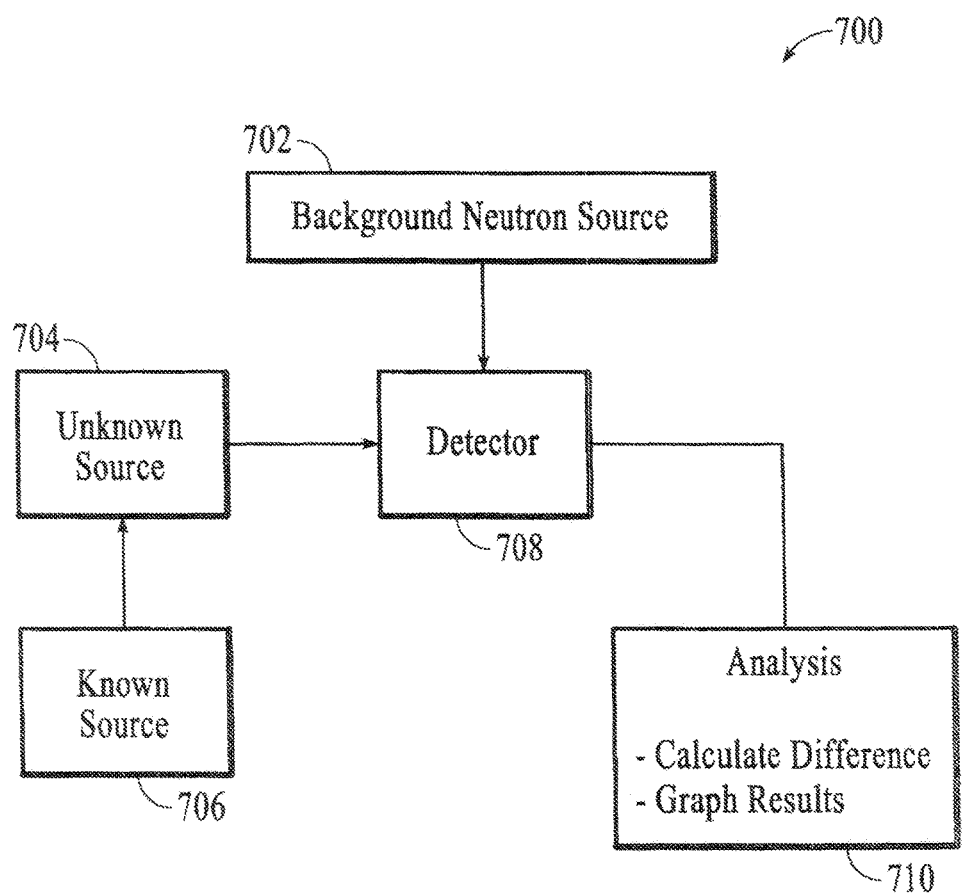
FIG. 7 illustrates a neutron detection system implementing certain embodiments of a correlation detection method, under an embodiment.

In one embodiment, the detection system includes a module that allows for active interrogation of an unknown neutron source. This system includes a source of neutrons, such as Californium (Cf) or Americium-Beryllium (AmBe) placed at a known distance from the unknown source. The active interrogation due to the presence of a neutron source effectively forces neutrons into the source and results in more fissions. This generally increases the speed in which the neutron distribution for the unknown source is generated. The resulting neutron distribution is then observed. FIG. 7 illustrates a neutron detection system with active interrogation, under an embodiment. In system 700, unknown source 704 is placed in the proximity of detector 706. The detector 706 also picks up neutron emissions from background source 702. To counteract the effects of this background noise, a known source 708 is used to drive neutrons into the unknown source 704. The resulting neutron emission distribution is then plotted relative to a Poisson distribution, and a graph, such as that shown in FIG. 3 is displayed using graph generator 710. The active interrogation system of FIG. 7 can increase the strength of the unknown source above the ten to one ratio relative to the background, thus allowing greater possibility of detection from unnatural sources.

Detection Measure Independent of Count Rate

As stated in the Background section above, the objective of comparison-based methods is to assess a measurement to determine if there is correlation of emitted neutrons in excess of a background level of neutrons is susceptible to the case where background count rates vary or are not clearly defined. Embodiments are directed to a method of conditionally assessing the excess in correlation of an unknown measurement compared to the correlation present in a data defined as background, and to providing a technical definition of excess correlation intended to properly handle the measured excess correlation, unlike the error of simply subtracting an erroneously defined background rate, or subtracting the second moments derived from two measurements, or subtracting mass equivalents derived by some theory about how correlation relates to effective mass of decaying nuclear material.

In an embodiment, a detection method includes an assessment to determine if there is any degree of correlation of detected neutrons in excess of a defined background level of neutrons. Reverse engineering a measurement is based on the process of breaking down an observation into the constituent cumulants. A multiplicity count distribution measuring device is used to collect the total occurrences of different multiplet sizes (from 0 to some maximum) for a 512 microsecond wide observation time. The 512 microsecond window is re-sampled many times to build up enough counts so that the system is not statistics limited. The simplicity of the process is directly amenable to propagating error bars, which may be calculated as describe further below. In an example case, the process is illustrated with data that is not statistically challenged. When certain detection methods are used, the error bars associated with the quantities need to be compared to the derived excess correlation. If the excess correlation is required to be in excess of a certain value, e.g., $n\Delta$, then the alarm is justified. In an embodiment, a user may set the alarm threshold at however many multiples (n) of $\Delta$ are desired, with the standard expectation that the higher values of the multiplier n the lower chance of false alarm. Typically, $3\Delta$ is chosen because this means a false alarm rate of less than one in one thousand trials expected.

In an example, the data is a background measurement of duration of about 21.3 hours, and the number of 512 microsecond samples was 149,930,687 cycles. The observed count rate was 3.45 counts per second. The measured count distribution is as follows:

| # of zero's | 149,666,695 |
| # of one's | 262,878 |
| # of two's | 1,110 |
| # of three's | 4 |
| # of four's | 0 |
| # of five's | 0 |

The number of cycles to get this data was: 149666695+262878+1110+4=149,930,687 cycles of 512 microsecond duration repeats. The number of counts in this data was: 262878+2*1110+3*4=265,110 counts. The time of the measurement was: 149,930,687 cycles*0.512 ms/cycle=76764.511744 seconds (21.32 hours). The count rate for this data was: 265,110 counts/76764.711744 seconds=(approx.) 3.45 cps.

The normalized count distribution where the sum equals one can be:

| Multiplet | counts | normalized multiplet |
|---|---|---|
| # of zero's | 149,666,695 | bo zeros/149,930,687 cycles = 0.998239239 . . . |
| # of one's | 262878 | bi ones/149,930,687 cycles = 0.00175333019 . . . |
| # of two's | 1110 | b2 twos/149,930,687 cycles = 0.000007403421 . . . |
| # of three's | 4 | b3 threes/149,930,687 cycles = 0.00000002667899 . . . |

Where now the sum demonstrates unity to roundoff:

$$\sum_{n=0}^{\infty} b_n = 1$$

Certain studies have factored measured fission source measurements into components (see, e.g., Nuclear Science and Engineering, Hage and Cifferelli [89, 159-176 (1985)]). Embodiments do the same for the purpose of looking at the makeup of background. These components are an intermediate step, where the process will be able to regenerate the same correlation distribution, preserving these lambda values $\Lambda$'s, but for a different count rate, i.e., the count rate of the unknown material or source. The defined background has these cumulants which makes the definition of background, and specifically, the definition of the relative correlation in background, as evidenced by the non-zero $\Lambda 2$ and $\Lambda 3$. If the background were uncorrelated, i.e., Poisson, the $\Lambda 2$ and $\Lambda 3$ would be zero. The values of the lambda values for this example are given below:

$\Lambda_1 = b_1/b_0 = \#1$'s/#zero's=0.00175642 . . .
$\Lambda_2 = (2b_1/-\Lambda_1 b_1)/2b_0 = 0.00000587397$ . . .
$\Lambda_3 = (3b_3/-\Lambda_1 b_2 - 2\Lambda_2 b_1)/3b_0 = 0.0000000155058$ . . .

Once a measurement is broken into these cumulants, the process defines the background and compares it to some unknown measurement to assess if there is correlation in excess of the defined background. To do this, the unknown measurement is now broken into the cumulant space.

This unknown data is a measurement of a weak fission source that rivals the background count rate. In an example above, the count time was 512 seconds, and the number of 512 microsecond samples was 1,000,000 cycles. The observed count rate was 5.87955 counts per second. The measured count distribution is as follows:

| # of zeros | 997160 |
| # of ones | 2714 |
| # of twos | 103 |
| # of threes | 11 |
| # of fours | 5 |
| # of Fives | 4 |
| # of Sixs | 1 |
| # of Sevens | 1 |
| # of eights | 1 |
| # of Nines | 0 |

The number of cycles to get this data was: 997160+2714+103+11+5+4+1+1+1+1 equaling 1,000,000 cycles of 512 microsecond duration repeats. The number of counts in this data was: 2714+2*103+3*11+4*5+5*4+6*1+7*1+8*1=3014 counts. The time of the measurement was: 1,000,000 cycles*0.512 ms/cycle=512 seconds. The count rate for this data was: 3014 counts/512 seconds=5.8867 cps. A normalized count distribution where the sum equals one for this example case is as follows.

| Multiplet | counts | normalized multiplet |
|---|---|---|
| # of zeros | 997,160 | $b_0$ zeros/1,000,000 cycles = 0.99716 |
| # of ones | 2714 | $b_1$ ones/1,000,000 cycles = 0.002714 |
| # of twos | 103 | $b_2$ twos/1,000,000 cycles = 0.000103 |
| # of threes | 11 | $b_3$ threes/1,000,000 cycles = 0.0000011 |
| # of fours | 5 | $b_4$ = 5e-6 |
| # of fives | 4 | $b_5$ = 4e-6 |
| # of sixes | 1 | $b_6$ = 1e-6 |
| # of | 1 | $b_7$ = 1e-6 |
| # of eights | 1 | $b_8$ = 1e-6 |

Where now the sum demonstrates unity:

$$\sum_{n=0}^{\infty} b_n = 1$$

The unknown source has these cumulants which represents the definition of the correlation and count rate in the unknown data, and specifically, the comparative statement of the relative correlation in the unknown, as evidenced by the non-zero $\Lambda 2$, $\Lambda 3$ . . . , values:

$\Lambda_1 = b_1/b_0 = \#1$'s/#zero's=0.00272172 . . .
$\Lambda_2 = (2b_1/-\Lambda_1 b_1)/2b_0 = 0.00009958944$ . . .
$\Lambda_3 = (3b_3/-\Lambda_1 b_2 - 2\Lambda_2 b_1)/3b_0 = 0.0000107569$ . . .
$\Lambda_4 = 4.979$ . . . e-6
$\Lambda_5 = 3.996$ . . . e-6
$\Lambda_6 = 9.913$ . . . e-7
$\Lambda_7 = 9.996$ . . . e-7
$\Lambda_8 = 9.999$ . . . e-7

In an embodiment, the background is defined in terms of: $\Lambda_2$ background/$\Lambda_1$ background. The process determines whether the unknown neutron emission level exceeds this normalized correlation indicator, i.e., if the ratio is greater than one. The $\Lambda_1$ value is divided out because it represents the essence of the count rate in the data. The ratio of ($\Lambda_2/\Lambda_1$ msmt)/($\Lambda_2/\Lambda_1$ background) would then be equal to $\Lambda_2$ msmt/$\Lambda_2$ background if the $\Lambda_1$'s in the background definition above were adjusted to be the same count rate as the unknown, where "msmt" denotes a measured value for the unknown source. This process requires scaling of all the $\Lambda$'s in the definitional background to match the unknown count rate. This provides a normalized signature of an excess correlation in an unknown, relative to a correlated "background" of the same hypothesized count rate. This process factors out the effect of count rate and focuses the comparison on the actual correlation that is present. Because the $\Lambda_1$'s have been chosen to represent the essence of the count rate to be the same rate observed in the unknown, the value of: ($\Lambda_1$ msmt/$\Lambda_1$ background) can be taken as a simple indicator of excess correlation. Therefore, the scaled $\Lambda_2$ value is:

$$\Lambda_{2background}*(\text{Unknown count rate 5.88/background count rate 3.45})=0.00000587*1.704=0.0000100113\ldots$$

The process will also scale the other cumulants for the purpose of plotting the adjusted background so it can be visually compared as shown in the plot of unknown, Poisson, and adjusted background with its inherent correlation. The rest of the adjusted background hypothesis converted into count distribution data are produce by scaling all $\Lambda$'s of the background by 1.704, then making the b values as follows:

$b_0$=exp(-(L1+L2+L2))1000000 cycles=997001.52
$b_1$=2983.97 (by recursion in equations above)
$b_2$=14.44
$b_3$=0.06

Therefore the proposed excess background measure using the adjusted background definition gives an excess correlation signature of:

$$\Lambda_2 \text{ msmt}/\Lambda_8 \text{ background-adjusted}=0.00009958944/0.0000100113=9.947\ldots$$

This result indicates that there is significant correlation in the unknown compared to the normal correlation found in background. The plot of this unknown and background are visually indicative of a large difference and also corresponds to this ratio as calculated, even if the background truncates at a multiplet of 3 and is certainly clearly well above the Poisson plot. In other words, any unknown measurement can be compared to a Poisson expected count distribution or a background distribution both graphically and numerically in such a way that count rate variations in different locations do not mask the graphical indicators or the correlation.

Figure 8:
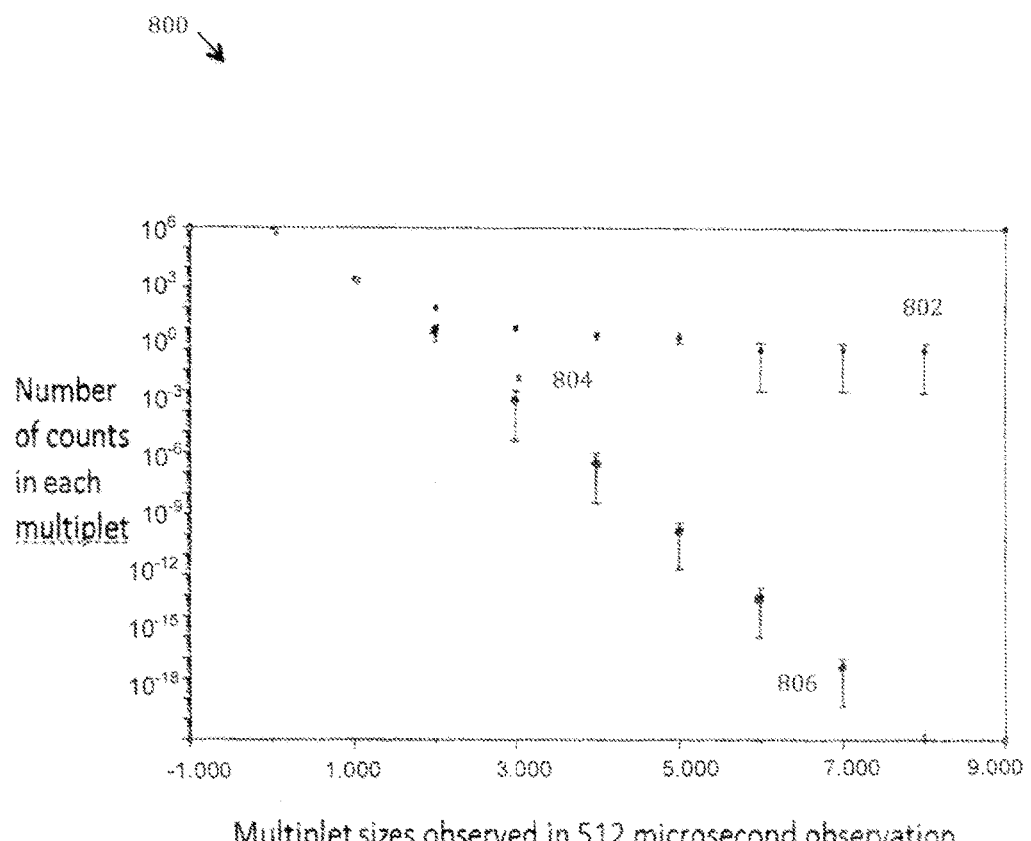
FIG. 8 illustrates a comparison of distribution plots for correlated background and unknown data, under an embodiment.
Figure 9:
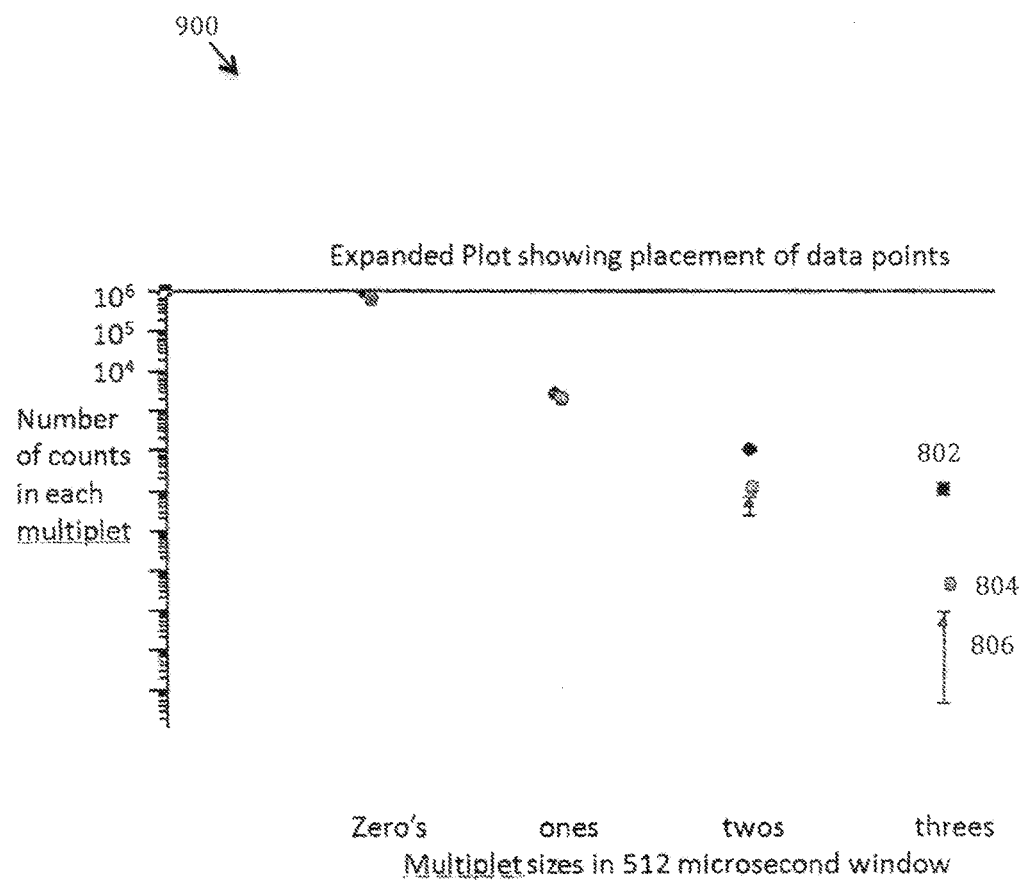
FIG. 9 is a more detailed view of a portion of the distribution plots of FIG. 8, under an embodiment.

FIG. 8 illustrates a comparison of distribution plots for correlated background and unknown data, under an embodiment. The vertical axis of plot 800 represents the number of counts in each multiplet and the horizontal axis of plot 800 represents the multiplet sizes observed in a 512 microsecond observation. Curve 802 of plot 800 represents a standard Poisson distribution, curve 804 is the correlated background distribution, and curve 806 is the unknown data. FIG. 9 is a more detailed view of a portion of the distribution plots of FIG. 8, and is an expanded plot showing specific placement of data points for the example of FIG. 8.

The examples shown provide a comparison of the second cumulant, normalized by the count rates and working in the linear space of the cumulants. This ratio was 9.97 indicating large correlation in excess of the correlated background. The process could also subtract the $\Lambda_2$ values as a true excess of correlation. What might be missing however, could be the correlation buried in the higher multiplets in the unknown and background measurements. Generalizing this ratio measure of $\Lambda_2 m/\Lambda_2 b$ to include the correlation that may be found in higher multiplets can also be represented by calculating Y2f where the additional correlation found in higher multiplets can contribute. When the process calculates $Y_2$fmeasurement/$Y_2$fbackground, the correlation ratio measure for this example jumps to about 26.7 because the unknown data has multiplets out to 8.

In an embodiment, the Y2f value is calculated from the cumulants as follows:

$$Y2f=(\Lambda_2+3\Lambda_3+6\Lambda_4+\ldots)/(\Lambda_1+2\Lambda_2+3\Lambda_3+\ldots)$$

Which for background gives 0.0033 and for the unknown is 0.088 resulting in the ratio of approximately 26.7. The logic in extending from $\Lambda_2$ ratios to Y2f ratios is that Y2f defines the number of net pairs that were seen in the data.

Note that Y2f contains all the correlation data. The ratio of Y2f values therefore offers the same intent of excess correlation in a measurement of unknown compared to a selected background definition. There is thus the option to plot the raw data, the background definition properly scaled in count rate, and a Poisson expectation for that unknown count rate to provide a graphical and numerical statement of excess correlation as a detection measure for correlated sources.

Error Bar Calculation

As stated above, correlation process involves propagating error bars associated with the quantities need to be compared to the derived excess correlation. Examples of such error bars are illustrated as the upper and lower bounds of values graphed in the distribution plots of FIGS. 8 and 9. With regard to calculating error bars, the process first starts with notation for the raw data where we define the b's, which are the count sums for each multiplet in the collected data. The process works with a normalized data set, illustrated here, where the sum of the normalized multiplets equals one.

| Multiplet | counts | normalized multiplet |
|---|---|---|
| # of zero's | $10^6$ | $b_0$ $10^6$/1,001,011 cycles = 0.99899002 |
| # of one's | $10^3$ | $b_1$ $10^3$/1,001,011 cycles = 0.00099899002 |
| # of two's | 10 | $b_2$ 10/1,001,011 cycles = 0.00000099899002 |
| # of three's | 1 | $b_3$ 1/1,001,011 cycles = 0.000000099899002 |

The notation for the sum is:

$$\sum_{n=0}^{\infty} b_n = 1$$

The first error bar described is $\Delta b_n$, for use as described above, to determine whether the plot values are really in excess of the Poisson or background definition. Whether visually plotted or numerically quoted, there is a measure of true statistical excess defined. The value for this first error bar is defined as:

$$\Delta b_n = \frac{\sqrt{b_n(1-b_n)}}{\sqrt{N}}$$

Next we want to show how to calculate the error bar on the correlation parameters that are derived from the b's. We will first construct C, the mean count in the distribution for N, where N is the number of cycles or samples making up the count distribution. The uncertainty in standard deviations, for the correlation parameters derived from the count distribution.

To compare the measured and now so-called theoretical background to a measured unknown count distribution, we need to use the lambda values determined from the reverse engineering of background to construct a new count distribution with a count rate that is exactly the same as the measured unknown count distribution. To do this:

The count rate*time gate width=$c(\text{bar})=\Lambda_2+2\Lambda_2+3\Lambda_3$.

Since lambda is linearly proportional to source strength, all lambdas must be scaled uniformly by the factor necessary to get the cbar the same as the measured unknown data cbar. The order of operations is to compute cbar for the unknown measurement, scale the lambdas determined from the reference background to that cbar, then construct the model background for comparison to the unknown. A regression technique (curve comparison or fitting) can work, or more simply, since the number of zeros and ones are usually basically identical, a direct numerical comparison of the number of twos contains the essence of the difference in the two count distributions. The unknown will be either more or less correlated than background, or the same, within statistics.

A method for computing the b values from the lambdas may be given as:

$$b_0 = \exp\left(\sum_{j=1}^{\infty} \Lambda_j\right)$$

$$1^*b_1 = \Lambda_1 b_0$$

$$2^*b_2 = \Lambda_1 b_1 + 2\Lambda_2 b_0$$

$$3^*b_3 = \Lambda_1 b_2 + 2\Lambda_2 b_1 + 3\Lambda_3 b_0$$

This results in the b numbers still being normalized to a sum of one. To compare to the raw data, multiply the b's by the number of cycles in the measured unknown data. Alternatively, the regression may be done in lambda space ($\Lambda$-space) so that the process can factor the $\Lambda_1$ coefficient from the other lambdas to first determine the external random fraction, then the rest of the count distribution that was computed is reported as the correlated part.

The neutron detection system under an embodiment includes a Poisson neutron source, coupled with the utility of an instrument that can observe that such a source is or is not Poisson, coupled with an alarm that is sensitive to the distinction between Poisson and correlated neutrons. Such a system is implemented to operate in an in-beam mode (prompt fission neutrons) that is much more efficient than previous delay-based systems that require turning off the neutron interrogator prior to neutron detection. A side benefit of this systematic approach is to use the large increase in total efficiency to reduce the interrogation source strength by about a factor of 100, making portable field use much safer.

In one embodiment, the neutron detector system described herein can be embodied within a portable device that can be deployed in the field and used by personnel to detect the presence of potentially dangerous sources of radioactive material from virtually any type of object or item. The packaging around any such source can be shielded or unshielded. Such a detector system can also be used in any type of Nuclear Instrumentation Module (NIM) for use in experimental particle or nuclear physics.

Embodiments of the present invention are suitable to provide a simple, quick approach that minimally trained operators can use to improve the control of fissioning material. The operators, for example may include border or traffic police, baggage handlers or freight companies, or for international treaty agreements that endeavor to identify, segregate, or manage inventories of nuclear material.

Aspects of the circuitry and methodology may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: microcontrollers with memory (such as EEPROM), embedded microprocessors, firmware, software, etc. Furthermore, aspects of the memory test process may be embodied in microprocessors having software-based circuit emulation, discrete logic (sequential and combinatorial), custom devices, fuzzy (neural) logic, quantum devices, and hybrids of any of the above device types. As is understood in the art of electronic circuit manufacture, a number of different underlying device technologies may be provided in a variety of component types.

It should also be noted that the various functions disclosed herein may be described using any number of combinations of hardware, firmware, and/or as data and/or instructions embodied in various machine-readable or computer readable media, in terms of their behavioral, register transfer, logic component, and/or other characteristics.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While embodiments may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed:

1. A computer-implemented method of analyzing radiation of a target source relative to background by conditionally assessing an excess in correlation of neutron emission from the target source compared to background neutron emission, comprising:

measuring, for a first number of cycles, first neutrons detected by a detector not placed in proximity to the target source to derive a background multiplicity count distribution of different multiplet sizes for a defined observation time; normalizing the background multiplicity count distribution by dividing a number of first neutron detections for each multiplet size by the first number of cycles to generate a first set of normalized multiplets ($b_0$, $b_1$, $b_2$, $b_3$);

calculating, from the first set of normalized multiplets, a lambda value ($\Lambda_n$) for each multiplet size to determine if the detected neutrons represent a non-Poisson distribution based on non-zero values for at least second and third lamba ($\Lambda_2$, $\Lambda_3$) values;

defining the detected neutrons as background if at least the second and third lambda values are non-zero;

measuring, for a second number of cycles, second neutrons detected by the detector placed in proximity to the target source to derive a source multiplicity count distribution of different multiplet sizes for the defined observation time;

normalizing the source multiplicity count distribution by dividing a number of second neutron detections for each multiplet size by the second number of cycles to generate a second set of normalized multiplets;

calculating, from the second set of normalized multiplets, corresponding lambda values for each multiplet size;

dividing, for the first neutron detection, the second lambda value by the first lambda value ($\Lambda_2/\Lambda_1$) to derive a normalized correlation indicator;

using the normalized correlation indicator to scale all lambda values for the first set of normalized multiplets to match a count rate of the second neutron detections;

comparing the scaled lambda values to each of the corresponding lambda values for the second set of normalized multiplets and characterizing the target source as fissile material if each normalized source multiplet exceeds each respective normalized background multiplet by a threshold defined by the normalized correlation indicator.

2. The method of claim 1 wherein the first set of normalized multiplets comprises a first integer number n of multiplets, and wherein the second set of normalized multiplets comprises a second integer number m of multiplets.

3. The method of claim 2 wherein the scaling eliminates an effect of the count rate in the respective count distributions.

4. The method of claim 2 wherein the different multiplet sizes ranges from zero to six neutrons, and the defined observation time comprises 512 milliseconds.

5. The method of claim 1, wherein calculating the lambda value ($\Lambda_n$) for first set of normalized multiplets is performed by:

$\Lambda_1 = b_1/b_0$;
$\Lambda_2 = (2b_1/-\Lambda_1 b_1)/2b_0$; and
$\Lambda_3 = (3b_3/-\Lambda_1 b_1 - 2\Lambda_2 b_1/3b_0$.

* * * * *